Nov. 2, 1937. A. HANIQUE 2,097,522
MEANS FOR SIMULTANEOUSLY DETERMINING THE VOLUME, THE WEIGHT,
AND THE DENSITY OF GRANULAR AND OTHER MATERIALS
Filed Dec. 20, 1935 4 Sheets-Sheet 2

Nov. 2, 1937.   A. HANIQUE   2,097,522
MEANS FOR SIMULTANEOUSLY DETERMINING THE VOLUME, THE WEIGHT,
AND THE DENSITY OF GRANULAR AND OTHER MATERIALS
Filed Dec. 20, 1935   4 Sheets-Sheet 3
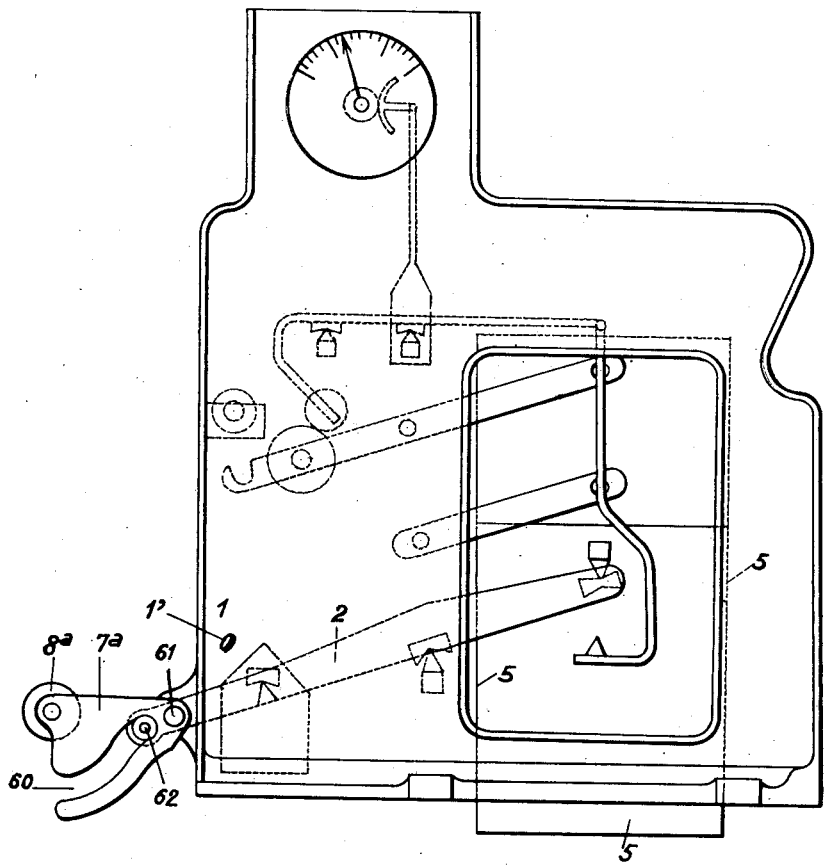
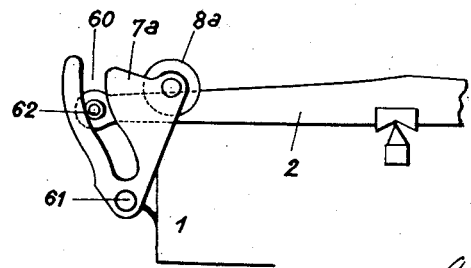

Patented Nov. 2, 1937

2,097,522

UNITED STATES PATENT OFFICE 2,097,522

MEANS FOR SIMULTANEOUSLY DETERMINING THE VOLUME, THE WEIGHT, AND THE DENSITY OF GRANULAR AND OTHER MATERIALS

Alfred Hanique, Paris, France

Application December 20, 1935, Serial No. 55,442
In France January 3, 1935

5 Claims. (Cl. 249—16)

Various types of apparatus exist which permit of automatically effecting the measurement of any volume of granular material under constant heapings.

In one of these types of apparatus forming the subject matter of application No. 702,634 which has matured into a Patent Number 2,010,760 a grab or skip integral with a compensating hopper is made use of, this assembly being secured on two beams or steelyards connected at their free ends by a stationary counterweight.

The present invention which forms an improvement in the apparatus above referred to has for its object to provide a device permitting of automatically and simultaneously obtaining the volumetric measurement, the weight and the density of granular material or the like and in particular of wheat under a constant heap.

Such an improved apparatus is shown by way of example in the accompanying drawings in which:—

Figure 1:
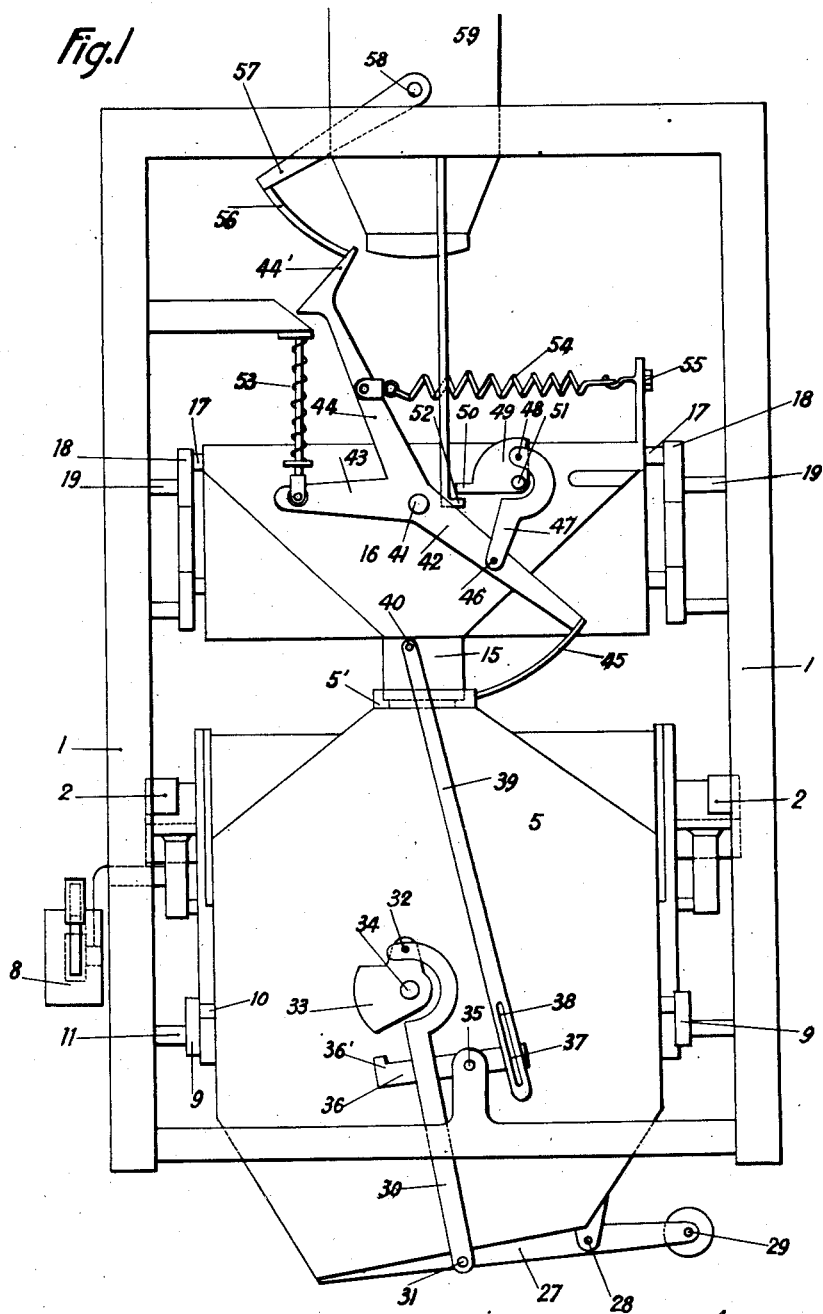
Figure 2:
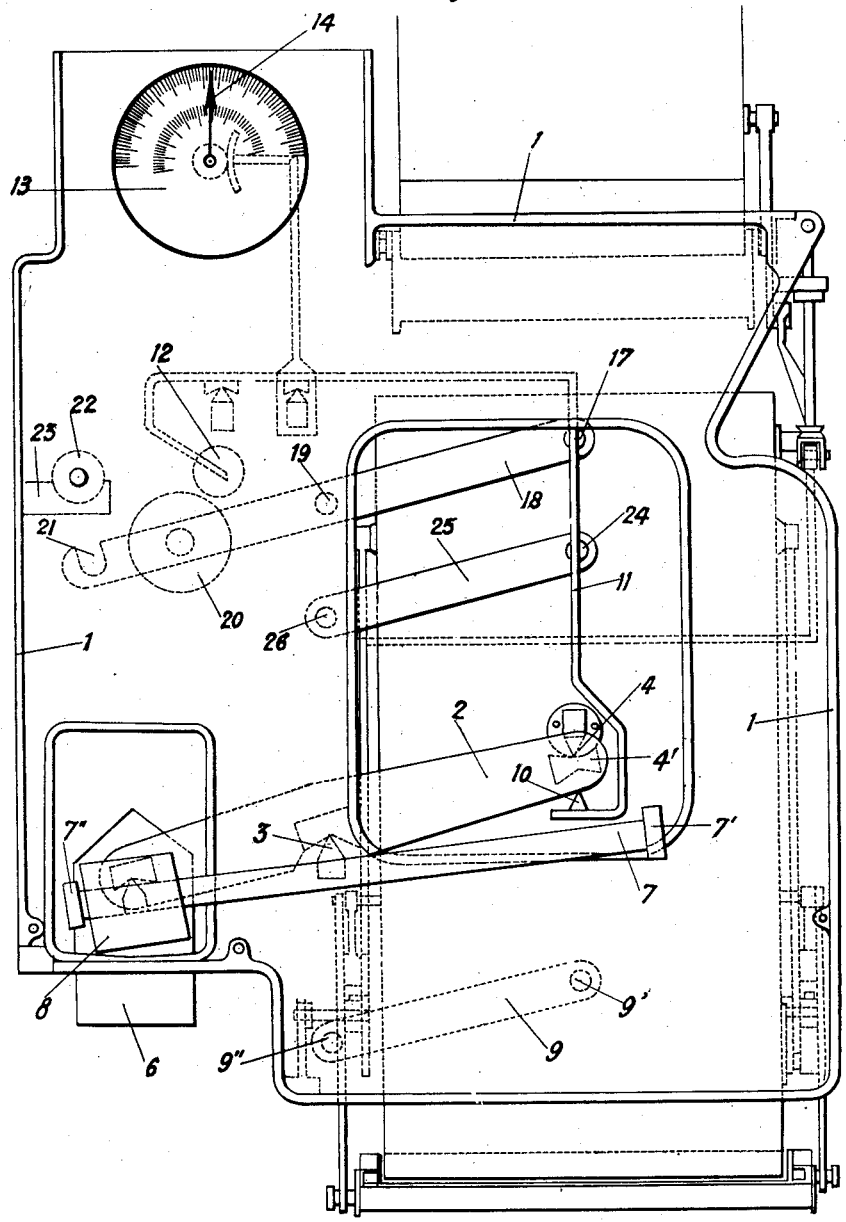

Figure 1 is a diagrammatic front elevation of a first form of construction; Fig. 2 is a corresponding side view; Fig. 3 is an elevation of a second form of construction, the counterweight being shown in its position for the filling of the skip; Fig. 4 is a view of a detail in which the counterweight is shown in the weighing position; Figs. 5 to 8 refer to modified constructions.

The apparatus comprises a frame 1 supporting, by means of knife edges 3, two main beams 2 (one on each side). These beams are articulated, at one of their extremities by means of knife edges 4, to the skip 5 and are provided at their other ends with a stationary counterweight 6.

On this end of one of the beams 2 is secured, according to the form of construction shown in Figs. 1 and 2, an arm 7 on which can freely slide a movable counterweight 8 the purpose of which will be understood hereinafter. Two counterbeams 9 mounted pivotally at 9' on the skip 5 and at 9" on the frame 1 hold the said skip in its vertical position.

The bearing points 4' of the knife edges 4 cooperate with a knife edge 10 provided at the lower end of the rod 11 of a steelyard 12 comprising a dial 13 marked with a double set of graduations the one indicating the weight of the material contained in the skip and the other the specific weight of the said material; these indications being given by a pointer 14.

The upper opening 5' of the skip 5 comprises a flange on which rests the lower extremity 15 of the compensating hopper 16. The independence of the skip 5 in relation to the compensating hopper 16 constitutes a characteristic feature of the present invention.

On said compensating hopper 16 are articulated at 17, two beams 18, one on each side. These beams 18 are articulated at 19 to the frame and comprise a counterweight 20. Their free extremities comprise a notch 21 cooperating with a loose counterweight 22 normally resting on a cradle 23 integral with the frame 1.

On the other hand at 24 are articulated on the hopper 16 by one of their ends, two counterbeams 25 (one on each side) the other end of these counterbeams being articulated at 26 on the frame 1.

The skip 5 is closed at the lower part by a door 27 pivoted at 28 and provided with a counterweight 29. Two rods 30 one at each side are articulated at 31 on said door. The free ends of these rods are articulated at 32 to a locking cam 33 pivoting with an axis 34 which traverses the skip.

One one side of the skip 5 is pivotally mounted on the frame 1, at 35, a latch member 36 one extremity of which carries a tenon 37 which can move in a button hole 38 formed in the rod 39 pivoted at its upper extremity at 40 to the compensating hopper 16. On this compensating hopper 16 is articulated at 41 a three-armed lever 42—43—44. The arm 42 has at its free end a door 45 adapted to stop the discharge of the material from the compensating hopper 16 into the skip 5 and to level the contents of this latter.

On the other hand on the arm 42 is articulated at 46 a bent lever 47 articulated at 48 to a locking cam 49 having a heel-piece forming abutment 50 and pivotally mounted at 51 to the compensating hopper. With the stop 50 there cooperates a stationary abutment 52 integral with the frame 1. At the end of the arm 43 is attached by one end a spring 53 working under compression the other extremity of this spring engaging with the frame 1.

A traction spring 54 is secured by one of its extremities to the arm 44 and by its other extremity to a support 55 integral with the compensating hopper. On the extremity 44' of the said arm 44, rests a door 56 integral with an arm 57 articulated at 58 on the loading hopper 59. In the position of rest the different parts of the apparatus occupy the position shown in Fig. 1 the doors 56 and 45 being open and the door 27 being closed.

The operation of the apparatus is as follows:—

The material arriving via the loading hopper 59 falls into the compensating hopper 16 and from the latter into the skip 5. When this skip is full, the material rises in the compensating hopper 16 until the total weight of said material shall be preponderous in relation to the counterweights 6, 8 and 20. At this moment, the equilibrium is broken, the skip 5 and the compensating hopper 16 descend until the notch 21 of the beam 18 comes in contact with the loose counterweight 22. In this downward movement the spring 53 which was compressed, is extended. Simultaneously the nose 50 meets the stationary abutment 52. The downward movement continuing, the locking cam 49 rotates on its axis 51 and liberates the rod 47 which in turn liberates the three-armed lever 42—43—44. This lever under the influence of the stretched spring 54 rotates on its axis 41 carrying along therewith in its movement the door 45 which closes the hopper 16 and levels the material contained in the skip 5. At the same time the stop 44' which held the door of the loading hopper 59 open, liberates this door and allows it to partly close. At this moment the arm 7 forming part of the beams 2, has its extremity 7' lower than its extremity 7"; the movable counterweight 8 slides on the said arm 7 and comes against the abutment 7'. The skip 5 being thus weighted by the counterweight 8 is freed from the compensating hopper 16 which has been temporarily stopped by the counterweight 22. It comes through the intermediary of the member 4' of one of the beams 2 to bear on the knife edge 10 of the steelyard, actuating the pointer 14 which moves over the dial 13 as explained hereinbefore. In this manner the weight and the density of the material contained in the skip are indicated, inasmuch as the volume of the material to be weighed (capacity of the skip 5) being always constant, the density is of necessity a ratio of the weight and hence the same pointer can indicate simultaneously both the weight and density by moving over the same dial bearing two sets of indications.

When the weight of the material which continues to fall into the compensating hopper 16 through the door 56 which has remained partly open, is sufficient, this compensating hopper carries along the counterweight 22 and through the intermediary of the rod 39 which pushes the tenon 37 of the arm 36, this arm oscillates around its axis 35; the extremity 36' of said arm 36 coming in contact with the member 33, releases or unlocks it thus freeing the rods 30 which permit the lower door 27 to open under the action of the contents of the skip.

When the skip 5 is empty the door 27 closes again under the influence of its counterweight 29.

Through the effect of the counterweight 6, the skip 5 when empty, ascends and meeting the hopper 16, brings it back to its initial position. This upward movement produces the compression of the spring 53 and the return to open position of the doors 56 and 45 the arm 7 taking up an inclination inverse to the previous one permits the counterweight 8 to come back also to its initial position (Fig. 2).

The weight measurements indicated by the pointer can be automatically recorded by means of any appropriate mechanism.

A modification represented in Figures 3 and 4 allows of simplifying the construction and increasing the precision of the apparatus. In this modification the sliding mass or counterweight 8 mounted on the arm 7 in the form of construction shown in Figs. 1 and 2 is replaced by a counterweight 8ª secured to the extremities of two parallel arms 7ª provided with a slide 60 forming ramp, these arms each pivoting on an axis 61 integral with the frame 1 of the apparatus. In the slides 60 of the arms 7ª are freely engaged rollers 62 carried by the extremity of the beams 2. As long as the skip 5 is being filled the arms 7ª occupy the position represented in Fig. 3 in which the rollers 62 are located in the bottom of the slide 60 and the counterweight 8ª exerts its maximum action on the main beams.

When the filling operation is terminated and the downward movement of the skip takes place the ends of the main beams 2 rise and their rollers, moving in the slides 60 cause the arms 7ª to pivot about their axes 61. These arms rest on a stop 1' and the counterweight 8ª occupies then the position represented on the Figure 4 where it no longer exerts any action on the extremity of the beams, the rollers 62 being free in their slides. The result is a break in the equilibrium to the advantage of the skip 5 which latter acts on the weighing mechanism as in the first form of construction.

After weighing and emptying of the skip the latter rises and the extremity of the beams opposite to the skip descend or fall and return the arms 7ª to their initial position represented in Fig. 3. The apparatus is then ready to start a fresh operation.

Figure 5:
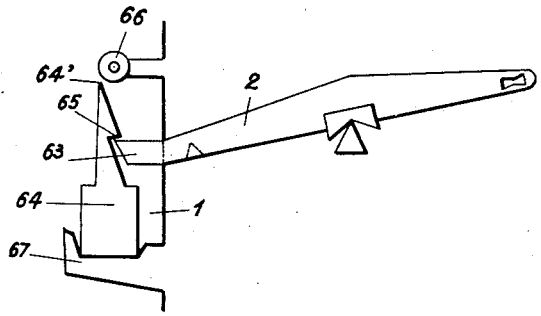
Figure 6:
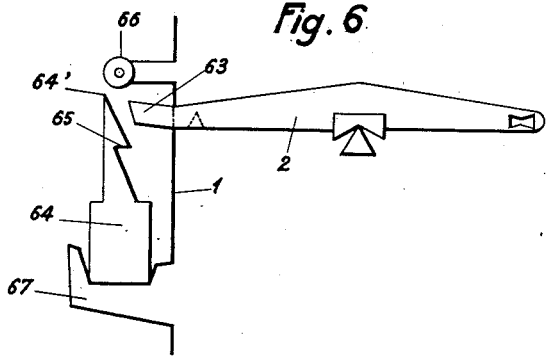

In the modification represented by Figures 5 and 6 the end of the main beams 2 opposite to the skip 5 comprises a nose 63 on which can engage a counterweight 64 provided for this purpose with a notch 65 at its upper part. This counterweight normally rests on a cradle 67 integral with the frame 1.

As long as the skip is not filled the nose of the beam 2 is engaged in the notch 65 of the counterweight 64 (Fig. 5). But when the loaded skip descends, the upper end 64' of the counterweight 64 comes in contact with a stop 66 integral with the frame 1 which stop causes the notch 65 to liberate the nose 63 (Fig. 6). The result is, as in the case of Fig. 4, a break in the equilibrium to the advantage of the skip and the fall of the counterweight 64 on its cradle 67.

When the empty skip moves upwardly again to its initial position the nose 63 will again engage in the notch 65 of the counterweight 64 and the apparatus will be ready for a fresh operation.

Figure 7:
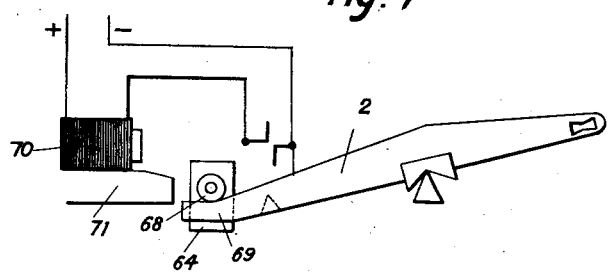
Figure 8:
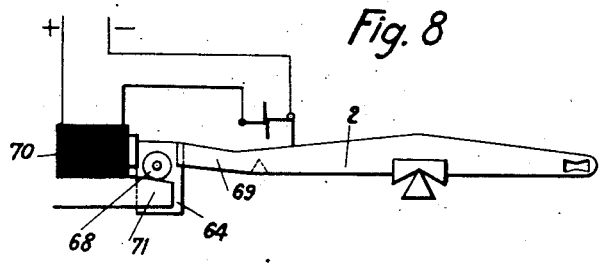

In the modification represented in Figs. 7 and 8, the extremity of the beam opposite to the skip carries a counterweight of soft iron 64 provided with rollers 68. So long as the skip 5 is not filled, the counterweight 64 rests by means of its rollers 68, on the extremities 69 of the beams 2. When the loaded skip descends one of the beams 2 closes the circuit of an electromagnet 70 which attracts the counterweight 64 which rests, through the intermediary of its rollers 68, on the extremities in the shape of inclined planes, of two stationary supports 71. In this position the counterweight 64 has no effect or action on the beams and the interruption of equilibrium sought is thus obtained.

When the skip rises again, the movement of the beams 2 will interrupt the circuit to the electro-magnet 70 and by gravity, the counterweight 64 will return to its initial position (Fig. 7).

I claim:—

1. An apparatus for determining simultaneously the volume, weight and density of granular materials comprising a supply hopper for the material, a movable compensating hopper mounted below the supply hopper, a measuring skip mounted below said compensating hopper, said compensating hopper receiving material from the supply hopper, means for mounting said compensating hopper, counterbalance means for said compensating hopper and for the measuring skip, said means permitting the measuring skip, after it has been completely filled, to move independently from the compensating hopper and means for weighing the contents of the skip.

2. An apparatus for determining simultaneously the volume, weight and density of granular materials comprising a supply hopper for the material, a compensating hopper mounted below said supply hopper receiving material therefrom, means for movably mounting said compensating hopper, a measuring skip beneath said compensating hopper, said compensating hopper resting on said skip, said skip being fed with material from said compensating hopper, means for movably mounting said measuring skip, counterbalance means for said compensating hopper and for said measuring skip, said counterbalance means permitting the compensating hopper and measuring skip to move downwards after the measuring skip has been completely filled and a quantity of material has accumulated in the compensating hopper, means actuated by said downward movement for stopping the supply of material from the compensating hopper, said means simultaneously reducing the supply of material from the supply hopper, a second counterbalance means acting on the compensating hopper during the downward movement thereof and serving to arrest said movement, means for reducing the action of the counterbalance means of the filled measuring skip to said skip to continue its downward movement independently of the compensating hopper, means for subsequently weighing said skip and means actuated by a further movement of the compensating hopper when sufficient additional material has fallen therein to overcome the effect of said second counterbalance means permitting discharge of material from the skip, the different parts of the apparatus being returned to their original positions under the influence of the various counterbalance means.

3. Apparatus for determining simultaneously the volume, weight and density of granular materials, as claimed in claim 2, comprising a measuring skip, a pair of pivoted beams supporting said skip, an arm connected to said pivoted beams, a weight adapted to slide along said arm, during the filling of the measuring skip, said weight being disposed at one end of the arm to exert the maximum counterbalance effect on the skip, said weight sliding along said arm during the first part of the descending movement of the compensating hopper and the loaded measuring skip to reduce the counterbalance action on said measuring skip permitting same to continue its descent independently of the compensating hopper.

4. An apparatus for determining simultaneously the volume, weight and density of granular materials, as claimed in claim 2, comprising a measuring skip, a pair of pivoted beams carrying said measuring skip at one end thereof, arms pivoted to the frame of the machine adjacent the other end of said beams, slots in said arms, pins on the beams engaging in said slots, and counterweights on the ends of said pivoted arms, said arms being arranged so that said counterweights have their maximum effect on the beams, the pins of which engage in the slots of the arms, during the filling of the measuring skip, but on the downward movement thereof said pins acting in said slots, turn said arms to a position wherein the counterweights no longer act on the ends of the beams.

5. An apparatus for determining simultaneously the volume, weight and density of granular materials as claimed in claim 2, comprising a measuring skip, a pair of pivoted beams carrying said measuring skip at one end thereof, counterweights disposed at the other end of said measuring skip, and means permitting the ends of said beams to engage the counterweights while the measuring skip is being filled, but permitting the ends of said beams being released from the counterweights as the measuring skip descends.

ALFRED HANIQUE.